(12) United States Patent
Donald et al.

(10) Patent No.: US 7,310,285 B2
(45) Date of Patent: Dec. 18, 2007

(54) METHOD FOR CHARACTERIZING SHEAR WAVE FORMATION ANISOTROPY

(75) Inventors: J. Adam Donald, Highlands Ranch, CO (US); Tom R. Bratton, Littleton, CO (US); John Walsh, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 98 days.

(21) Appl. No.: 11/196,907

(22) Filed: Aug. 4, 2005

(65) Prior Publication Data

US 2007/0030761 A1   Feb. 8, 2007

(51) Int. Cl.
G01S 15/00    (2006.01)
G01V 1/00     (2006.01)
(52) U.S. Cl. .................................... 367/40; 181/104
(58) Field of Classification Search ............ 367/40–41, 367/49, 33; 181/104
See application file for complete search history.

(56) References Cited

U.S. PATENT DOCUMENTS

| | | | |
|---|---|---|---|
| 4,803,666 A | | 2/1989 | Alford |
| 4,817,061 A | | 3/1989 | Alford et al. |
| 4,903,244 A | | 2/1990 | Alford |
| 5,027,332 A | | 6/1991 | Alford |
| 5,029,146 A | | 7/1991 | Alford |
| 5,047,992 A | * | 9/1991 | Howlett ....................... 367/31 |
| 5,398,215 A | | 3/1995 | Sinha et al. |
| 5,737,220 A | * | 4/1998 | Miller ......................... 702/14 |
| 5,838,633 A | | 11/1998 | Sinha |
| 6,351,991 B1 | | 3/2002 | Sinha |
| 6,510,104 B1 | * | 1/2003 | Ikegami ....................... 367/31 |

(Continued)

FOREIGN PATENT DOCUMENTS

GB    2288236 A    10/1995

OTHER PUBLICATIONS

Druzhini et al. Ray-Kirchoff multicomponent borehole seismic modelling in 3D heterogeneous, anisotropic media. Journal of Applied Geophysics. 55 (2004) 225-238.*

(Continued)

*Primary Examiner*—Deandra M Hughes
(74) *Attorney, Agent, or Firm*—Osha Liang LLP (57) ABSTRACT

A method of characterizing shear wave anisotropy in a formation includes obtaining crossed-dipole waveforms from a borehole penetrating the formation over a range of depths and frequencies, determining far-field slowness in a fast-shear and slow-shear direction using a low-frequency portion of the crossed-dipole waveforms, and determining near-wellbore slowness in the fast-shear and slow-shear directions using a high-frequency portion of the crossed-dipole waveforms. The method also includes marking a selected depth of the formation as having intrinsic anisotropy if at the selected depth the far-field slowness in the fast-shear direction is less than the far-field slowness in the slow-shear direction and the near-wellbore slowness in the fast-shear direction is less than the near-wellbore slowness in the slow-shear direction. The selected depth is marked as having stress-induced anisotropy if the far-field slowness in the fast-shear direction is less than the far-field slowness in the slow-shear direction and the near-wellbore slowness in the fast-shear direction is greater than the near-wellbore slowness in the slow-shear direction.

17 Claims, 8 Drawing Sheets

U.S. PATENT DOCUMENTS

| | | | |
|---|---|---|---|
| 6,526,354 B2 * | 2/2003 | Bose et al. | 702/14 |
| 6,611,761 B2 * | 8/2003 | Sinha et al. | 702/6 |
| 6,614,716 B2 * | 9/2003 | Plona et al. | 367/31 |
| 7,035,165 B2 * | 4/2006 | Tang | 367/28 |
| 7,042,802 B2 * | 5/2006 | Sinha | 367/86 |

OTHER PUBLICATIONS

Sinha et al. Borehole dipole and quadrupole modes in anisotropic formations. 2003 IEEE Symposium on Ultrasonics. Oct. 5-8, 2003. vol. 1. pp. 284-289.*

Alford, R. M., 1986, Shear data in the presence of azimuthal anisotropy: 56$^{th}$ Annual International Meeting, Society of Exploration Geophysicists, Expanded Abstracts, 476-479.

Plona T. J., et al., "Using Acoustic Anisotropy," paper presented at 41$^{st}$ SPWLA Symposium: Jun. 2000.

Plona T. J., et al., "Stress-Induced Dipole Anisotropy: Theory, Experiment and Field Data," paper RR, presented at 40$^{th}$ SPWLA Symposium '99.

Sinha, B.K. et al.; "Dipole Dispersion Crossover and Sonic Logs in a Limestone Reservoir"; Geophysics Soc. Exploration Geophysicists USA, vol. 65, No. 2, Mar. 2000, pp. 390-407, XP002429191, ISSN: 0016-8033 (18 pages).

Winkler, K.W. et al.; "Effects of Borehole Stress Concentrations on Dipole Anisotropy Measurements"; Geophysics, Society of Exploration Geophysicists, Tulsa, Oklahoma, US, vol. 63, No. 1, Jan. 1998, pp. 11-17, XP000750542, ISSN: 0016-8033 (4 pages).

Plona, T. et al.; "Identifying Formation Response Using Sonic Dispersion Curves"; SEG Technical Program Expanded Abstracts, vol. 23, Oct. 10-15, 2004, pp. 322-325, XP007901977 (4 pages).

Pistre, V. et al.; "Estimation of 3D Borehole Acoustic Rock Properties Using a New Modular Sonic Tool"; Eur. Assoc. Geosci. Eng. Conf. Exhibit Ext. Ast.; 67th European Association of Geoscientists and Engineers, Eage Conference and Exhibition, Incorporating SPE Europe2005—Extended Abstracts; 67th European Association of Geoscientists and Engineers, 2005, pp. 2029-2032, XP008077787 (4 pages).

International Search Report dated Apr. 17, 2007 (4 pages).

Sinha, B.K. et al.; "Stress-Induced Azimuthal Anisotropy in Borehold Flexural Waves"; Geophysics, vol. 61, No. 6, Nov.-Dec. 1996; pp. 1899-1907 (9 pages).

* cited by examiner

METHOD FOR CHARACTERIZING SHEAR WAVE FORMATION ANISOTROPY

BACKGROUND OF THE INVENTION

The invention relates generally to formation evaluation using borehole sonic logging. More specifically, the invention relates to a method for distinguishing between intrinsic and stress-induced anisotropy in an anisotropic formation.

A formation is said to be anisotropic if the value of a property of the formation varies with direction of measurement. A formation has shear wave anisotropy if shear wave velocity in the formation varies with azimuth. Shear wave anisotropy can be detected in a formation using a crossed-dipole sonic log obtained from a borehole penetrating the formation. The crossed-dipole sonic log is generated by measuring velocities of two orthogonal dipole modes in the formation. Two forms of shear wave anisotropy are considered herein: intrinsic and stress-induced. Intrinsic shear wave anisotropy may arise from intrinsic structural effects, such as layering of shale in a deviated borehole or aligned fractures, and tectonic stresses. Stress-induced shear wave anisotropy arises from the redistribution of the far-field horizontal stresses around the borehole. Existing crossed-dipole sonic log indicates anisotropic zones of the formation but does not indicate the dominant underlying cause of the anisotropy. However, distinguishing between intrinsic and stress-induced anisotropy is important. Intrinsic anisotropy, specifically fracture anisotropy, plays an important role in drilling, production, and completion strategies. For example, it is desirable that boreholes are placed in the formation such that they intersect as many fractures as possible. Stress-induced anisotropy plays an important role in completion strategies. For example, perforations oriented perpendicular to minimum stress direction can be used to optimize hydraulic fracture design.

Figure 1A:
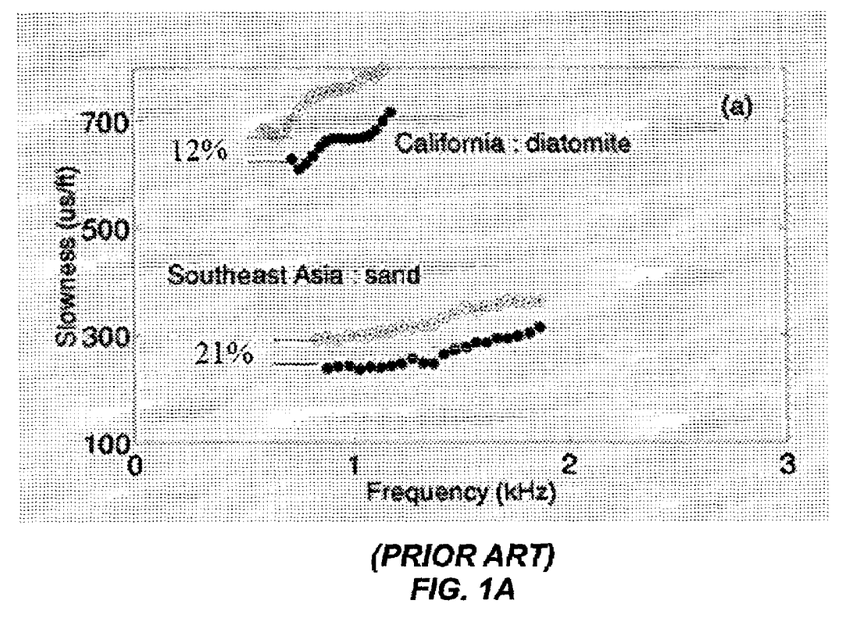
FIGS. 1A and 1B illustrate dispersion curves for different media.
Figure 1B:
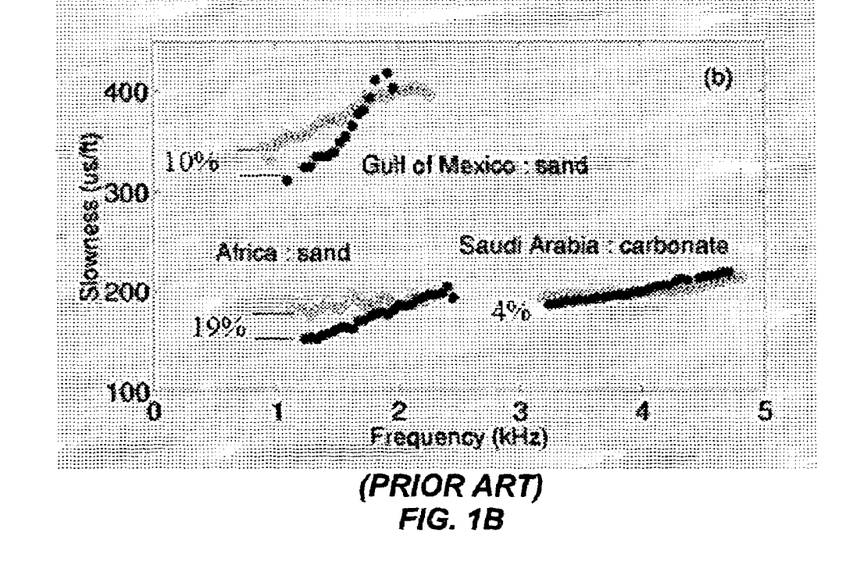

Plona et al. describe a method for distinguishing between intrinsic and stress-induced anisotropy in a formation using a crossed-dipole sonic log. (Plona T. J., et al., "Using Acoustic Anisotropy," paper presented at $41^{st}$ SPWLA Symposium: June 2000). The method exploits the fact that stress-induced dipole anisotropy in slow formations exhibits flexural mode dispersion crossover whereas intrinsic dipole anisotropy does not. (Plona T. J., et al., "Stress-Induced Dipole Anisotropy: Theory, Experiment and Field Data," paper RR, presented at $40^{th}$ SPWLA Symposium '99). The method includes obtaining crossed-dipole waveforms from a borehole. Alford Rotation is applied to the crossed-dipole waveforms to identify the fast-shear direction. Flexural dispersion curves, i.e., slowness versus frequency curves, are obtained by processing the rotated waveforms for dipole polarizations parallel and normal to the fast-shear and slow-shear directions using a modified matrix pencil algorithm. The slow-shear direction is orthogonal to the fast-shear direction. Slowness, measured in microseconds per foot, is the amount of time for a wave to travel a certain distance. FIGS. 1A and 1B show dispersion curves for an intrinsic anisotropic formation and a stress-induced anisotropic formation, respectively. The dispersion curves are generally parallel for an intrinsic anisotropic formation and cross for a stress-induced anisotropic formation. Although not shown in the figures, dispersion curves coincide for an isotropic formation.

The Plona et al. method of distinguishing between intrinsic and stress-induced anisotropy requires interpretation of individual dispersion curves, which may not be efficient or practical for large data sets. A continuous method of distinguishing between intrinsic and stress-induced anisotropy would be useful to efficiently diagnose the cause of anisotropy.

SUMMARY OF THE INVENTION

In one aspect, the invention relates to a method of characterizing shear wave anisotropy in a formation which comprises obtaining crossed-dipole waveforms from a borehole penetrating the formation over a range of depths and frequencies, determining far-field slowness in a fast-shear and slow-shear direction using a low frequency portion of the crossed-dipole waveforms, determining near-wellbore slowness in the fast-shear and slow-shear directions using a high-frequency portion of the crossed-dipole waveforms, marking a selected depth of the formation as having intrinsic anisotropy if at the selected depth the far-field slowness in the fast-shear direction is less than the far-field slowness in the slow-shear direction and the near-wellbore slowness in the fast-shear direction is less than the near-wellbore slowness in the slow-shear direction, and marking a selected depth of the formation as having stress-induced anisotropy if at the selected depth the far-field slowness in the fast-shear direction is less than the far-field slowness in the slow-shear direction and the near-wellbore slowness in the fast-shear direction is greater than the near-wellbore slowness in the slow-shear direction.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 2A:
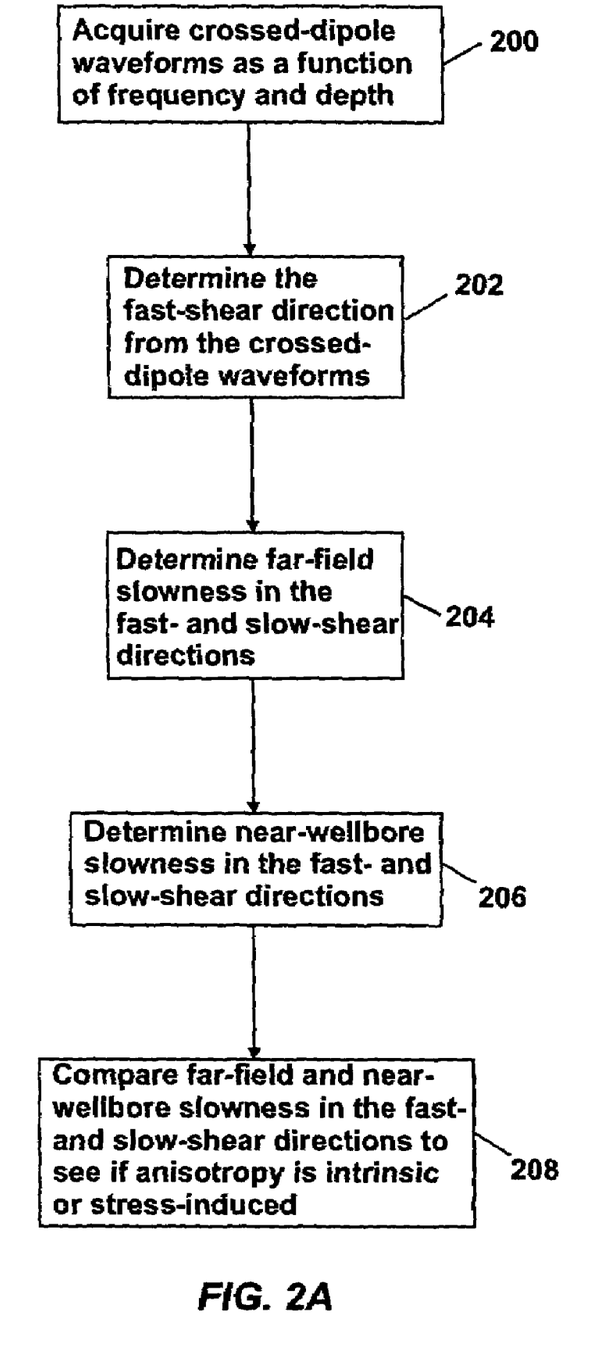
FIGS. 2A and 2B are flowcharts illustrating a method of characterizing shear wave formation anisotropy according to one embodiment of the invention.

FIG. 2A is a flowchart illustrating a method of characterizing shear wave formation anisotropy according to one embodiment of the invention. The method includes acquiring crossed-dipole waveforms from a borehole penetrating a formation as a function of frequency and depth in the borehole (200). The method further includes determining the fast-shear direction or azimuth (202). Methods for determining the fast-shear direction include, but are not limited to, Alford Rotation and parametric inversion of the crossed-dipole waveforms. The slow-shear direction is orthogonal to the fast-shear direction. The method further includes determining far-field slowness in the fast-shear and slow-shear directions (204). The method further includes determining near-wellbore slowness in the fast-shear and slow-shear directions (206). For a selected interval of the formation, the method includes distinguishing between intrinsic and stress-induced anisotropy by comparing the far-field and near-wellbore slownesses in the fast-shear and slow-shear directions (208). If the interval of the formation has intrinsic anisotropy, the shear slownesses in the fast-shear and slow-shear directions will be consistent from the near-wellbore to the far-field (i.e., parallel dispersion curves). If the interval of the formation has stress-induced anisotropy, the shear slownesses in the fast-shear and slow-shear directions will not be consistent from the near-wellbore to the far-field (i.e., crossing dispersion curves). The method of the invention avoids advanced dispersion analysis by simply comparing the far-field and near-wellbore slownesses for the fast-shear and slow-shear directions in the time domain.

Figure 2B:
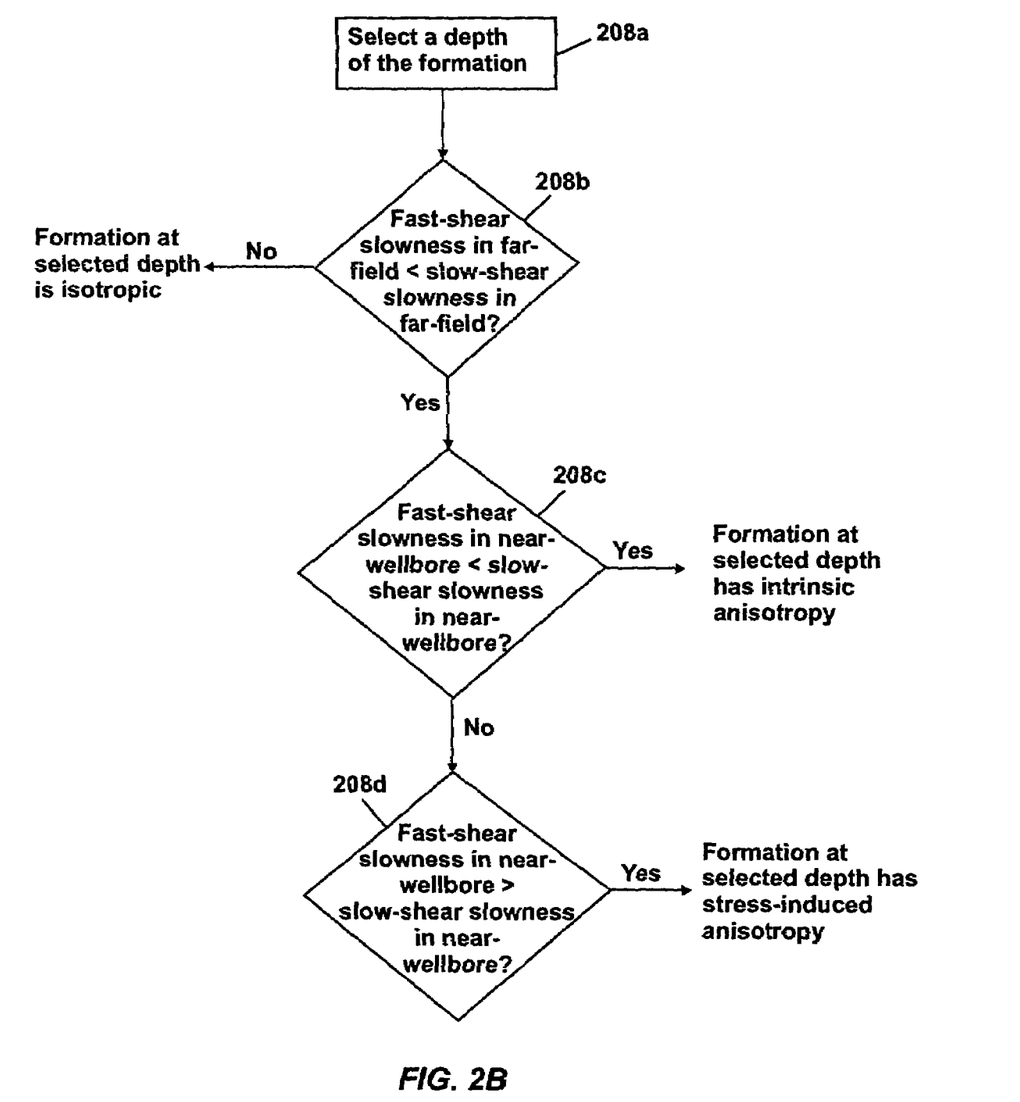
Figure 3A:
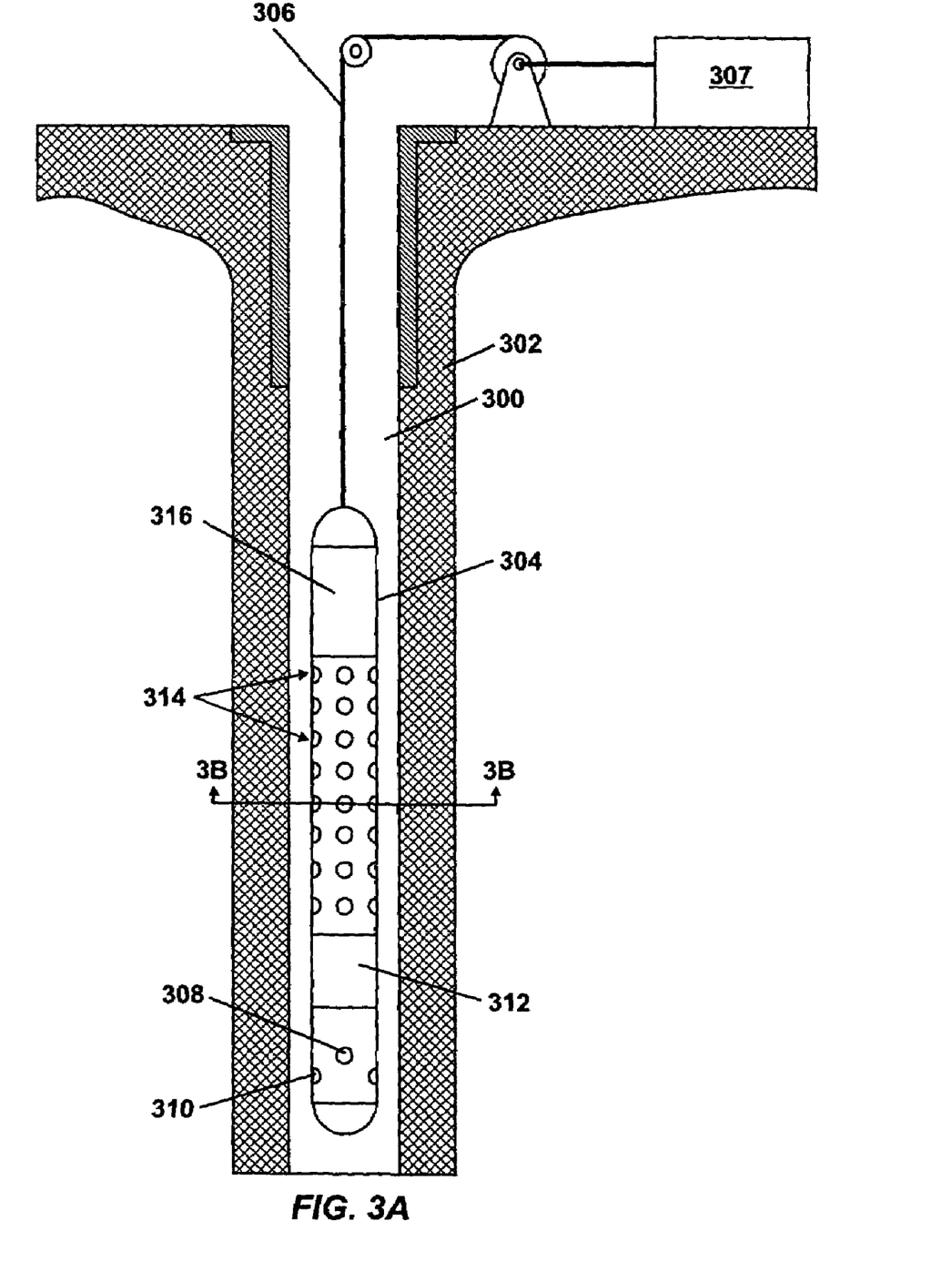
FIGS. 3A and 3B illustrate a setup for acquiring crossed-dipole waveforms from a borehole.

FIG. 3A illustrates a setup for acquiring crossed-dipole waveforms from a borehole 300 penetrating a subterranean formation 302. The crossed-dipole waveforms are acquired as a function of frequency and depth in the borehole 300. It should be noted that only the parts of the setup relevant to the understanding of the invention are shown and described. The borehole 300 may be a vertical hole or a deviated hole and is filled with fluid or drilling mud. A logging tool 304 is disposed in the borehole 300. For measurement purposes, the logging tool 304 may be conveyed to a desired depth in the borehole 300 in a number of ways, including, but not limited to, on the end of a wireline, coiled tubing, or drill pipe. For illustration purposes, the logging tool 304 is shown at the end of a wireline 306. The length of the wireline 306 may provide an estimate of the depth of the logging tool 304 in the borehole 300. The wireline 306 may also be used to provide communication between the logging tool 304 and a surface system 307. The surface system 307 may include a processor which executes an algorithm for characterizing shear wave formation anisotropy, as outlined in FIGS. 2A and 2B.

The logging tool 304 can be any tool that can provide borehole shear slowness along two orthogonal directions, such as one available under the trade name Dipole Shear Imager (DSI) tool from Schlumberger. For illustration purposes, the logging tool 304 includes dipole sources 308, 310. The dipole sources 308, 310 are in orthogonal relation to each other and may or may not be on the same plane. The logging tool 304 may include an isolation joint 312 to prevent signals from the dipole sources 308, 310 from traveling up the tool. The dipole sources 308, 310 may be any source suitable for shear/flexural logging, such as piezoelectric ceramics made in benders or cylindrical sections, magnetostrictive transducers, and electrodynamic vibrators. In one embodiment, the dipole source 308 generates flexural waves at a relatively low frequency, and the dipole source 310 generates flexural waves at a relatively high frequency. The low and high frequencies are preferably chosen such that if a dispersion crossover occurs it would be detectible. However, this does not mean that a dispersion analysis is required for practice of the invention. On the other hand, existing dispersion curves can provide general information on radial gradient of shear slowness, which can assist in selecting operating frequencies of the dipole sources 308, 310. In general, long wavelength/low frequency probes deep and short wavelength/high frequency probes shallow.

Figure 4:
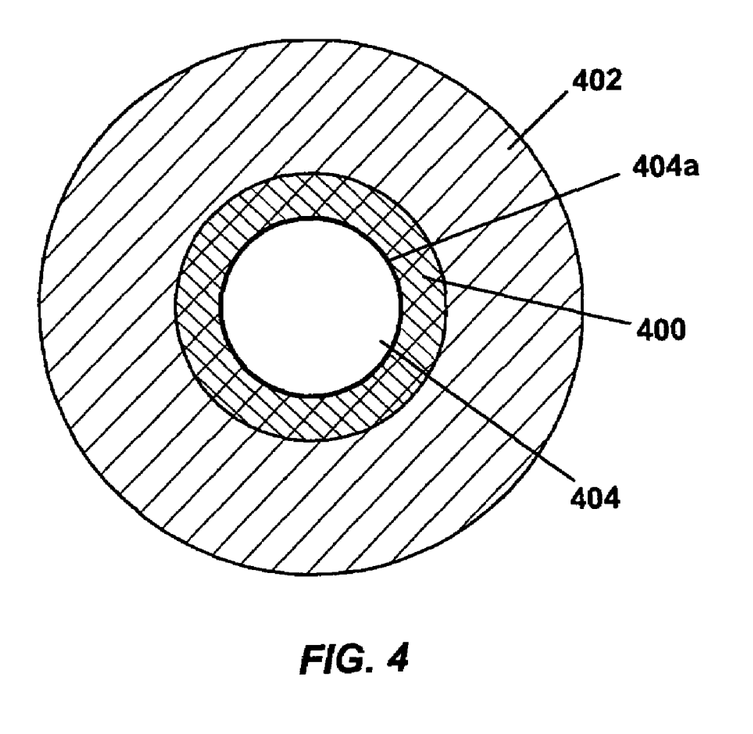
FIG. 4 illustrates near-wellbore and far-field regions for a borehole.

Preferably, the relatively low frequency of the dipole source 308 is chosen such that the far-field region of the borehole 300 is probed. Preferably, the relatively high frequency of the dipole source 310 is chosen such that the near-wellbore region of the borehole 300 is probed. The depth of investigation is proportional to the wavelength, which is a function of velocity and frequency, i.e., $\lambda = v/f$, where $\lambda$ is wavelength, V is velocity, and f is frequency. Velocity and frequency depend on the formation characteristics and borehole diameter. FIG. 4 illustrates a near-wellbore region 400 and a far-field region 402 for a borehole 404. Generally, the near-wellbore region 400 is about ½ borehole diameter, measured radially from the surface 404a of the borehole 404. If the borehole diameter is 12 in., for example, then the near-wellbore region 400 would be about 6 in. measured radially from the surface 404a of the borehole 404. For many formations, approximately 4-7 kHz would probe the near-wellbore region. Generally, the far-field region 402 is about 2-3 borehole diameters, measured radially from the surface 404a of the borehole 404. If the borehole diameter is 12 in., for example, then the far-field region 402 would be about 24 in. to 36 in. measured radially from the surface 404a of the borehole 404. For many formations, approximately 1-3 kHz would probe the far-field region. However, the invention is not limited to these frequency ranges. For example, approximately 4-12 kHz could be used to probe the near-wellbore region, and approximately 1-3.5 kHz could be used to probe the far-field region.

Figure 3B:
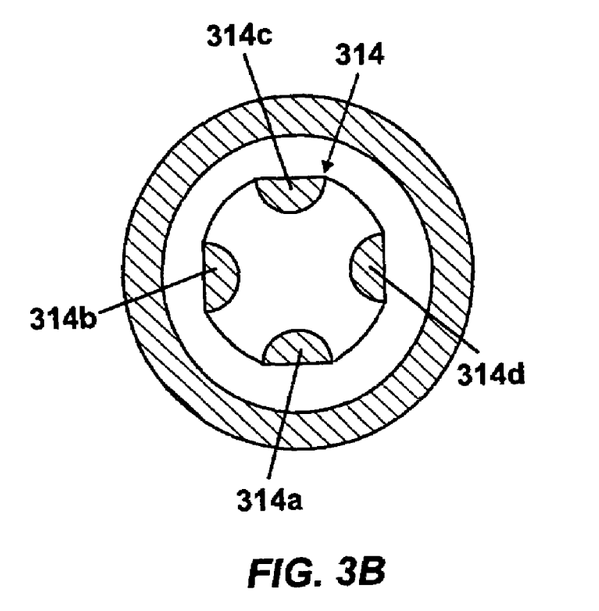

Returning to FIG. 3A, the logging tool 304 includes a plurality of spaced-apart receiver stations 314. As shown in FIG. 3B, each receiver station 314 includes four dipole receivers 314a, 314b, 314c, and 314d. The dipole receivers 314a, 314c form a pair and are oriented inline with the dipole source 308 and orthogonal to the dipole source 310, and the dipole receivers 314b, 314d form a pair and are oriented inline with the dipole source 310 and orthogonal to the dipole source 308. This arrangement allows detection of flexural wave signals in the fast-shear and slow-shear directions. The dipole receivers 314a, 314b, 314c, and 314d may be any type of dipole transducer that detects pressure gradients or particle vibrations, such as hydrophones, benders, and electrodynamic transducers, and is sensitive in the frequency range of the dipole sources (308, 310 in FIG. 3A). Although this figure shows just four receivers, the receiver station could consist of any number of receivers, for example eight receivers arranged azimuthally with 45 degree separation, thus including the detection of flexural wave signals from modal decomposition.

Returning to FIG. 3A, the logging tool 304 also includes an electronics cartridge 316 which includes circuitry to power the dipole sources 308, 310 and receiver stations 314 and to process signals received at the receiver stations 314. Such processing may include digitizing the separate waveforms received at the receiver stations 314 and stacking the waveforms from multiple firings of the dipole sources 308, 310. The electronics cartridge 316 may further transmit the processed signals to the surface system 307 or store the processed signals in a downhole memory tool (not shown), in which case the data can be retrieved when the logging tool 304 is pulled to the surface.

In operation, the dipole sources 308, 310 emit dipole acoustic signals which excite flexural wave frequencies in the formation 302. The dipole receivers 314 detect dipole acoustic signals from the formation 302. The logging tool 304 rotates in the borehole 300 so that the dipole sources 308, 310 can be fired at different azimuthal positions around the borehole 300. The crossed-dipole waveforms recorded by the dipole receivers 314 generally have a multitude of arrivals, often including a compressional arrival, a shear arrival, and a flexural mode arrival. The flexural mode arrival dominates the borehole response and is dispersive and is most suitable for processing. However, other modes could be processed as well. Excitation of the borehole 300 at an arbitrary azimuthal orientation results in two shear waves if anisotropy is present, one propagating as a fast-shear wave and another propagating as a slow-shear wave.

Each crossed-dipole waveform received at one of the receiver stations 314 has four components produced from inline and orthogonal orientation of each receiver pair (314a, 314c and 314b, 314d in FIG. 3B) with each of the dipole sources 308, 310. The method according to one embodiment of the invention includes determining the fast-shear direction or azimuth from these four-component crossed-dipole waveforms (202 in FIG. 2A). Methods for determining the fast-shear direction include, but are not limited to, Alford Rotation and parametric inversion of the crossed-dipole waveforms. The slow-shear direction is simply orthogonal to the fast-shear direction.

Alford rotation is described in, for example, Alford, R. M., 1986, Shear data in the presence of azimuthal anisotropy: $56^{th}$ Annual International Meeting, Society of Exploration Geophysicists, Expanded Abstracts, 476-479, and U.S. Pat. Nos. 4,803,666, 4,817,061, 5,025,332, 4,903,244, and 5,029,146, the contents of which are incorporated herein by reference. Generally speaking, Alford rotation involves choosing a number of rotation angles, applying these rotation angles to the four-component crossed-dipole waveform data, and finding an angle that minimizes the energy in the mismatched components (or cross-line/off-line components).

Figure 5:
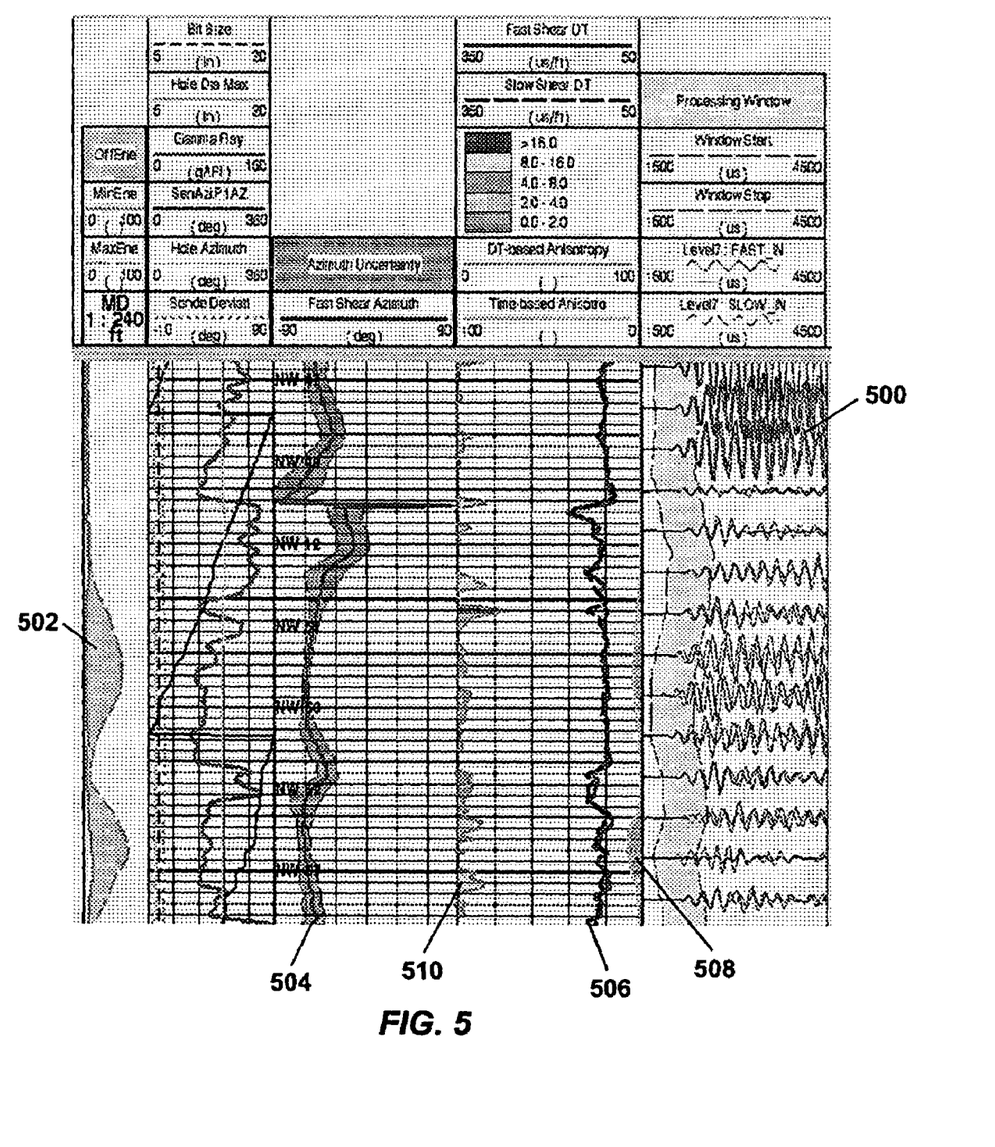
FIG. 5 shows a log obtained from Alford Rotation processing of crossed-dipole waveforms.

FIG. 5 shows an example of a log produced from Alford Rotation processing of crossed-dipole waveforms. The raw waveforms are shown at 500. The difference between minimum and maximum cross-line energy resulting from the mismatched components, which is the end result of the Alford Rotation processing for determining the fast-shear direction, is shown at 502. The fast-shear direction, which is determined based on the minimization of the cross-line components, is shown at 504. Track 506 represents the raw waveforms 500 rotated into the fast-shear and slow-shear directions. The slow-shear direction is orthogonal to the fast-shear direction. Track 508 shows the difference between fast-shear and slow-shear slowness of rotated waveforms. Track 510 shows the difference between fast and slow arrival times of rotated waveforms. It should be noted that the slownesses are presented only at low frequencies (1-3 kHz), but the invention involves Alford Rotation of low- and high-frequency portions of the crossed-dipole waveforms.

Figure 6A:
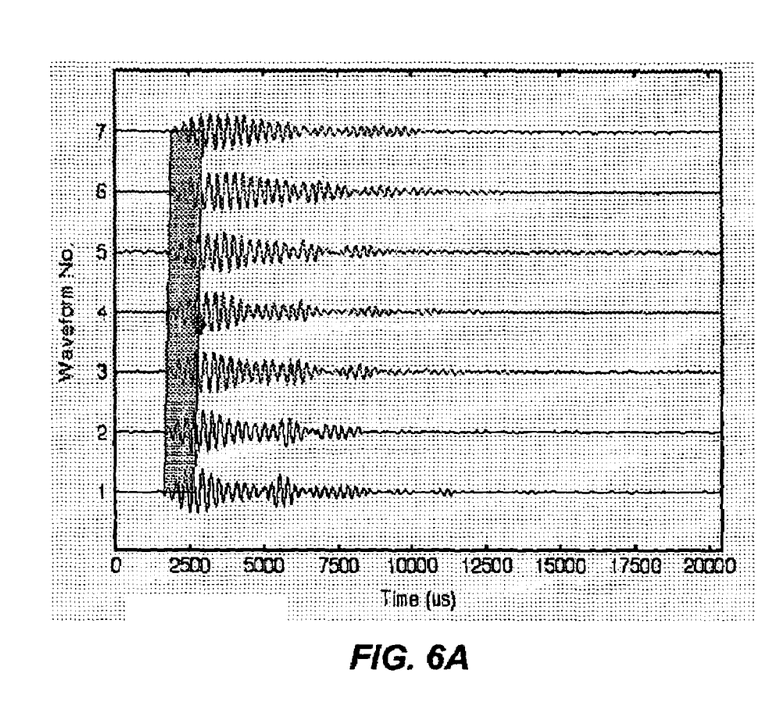
FIG. 6A shows crossed-dipole waveforms obtained at a selected depth in a borehole penetrating a slow formation.
Figure 6B:
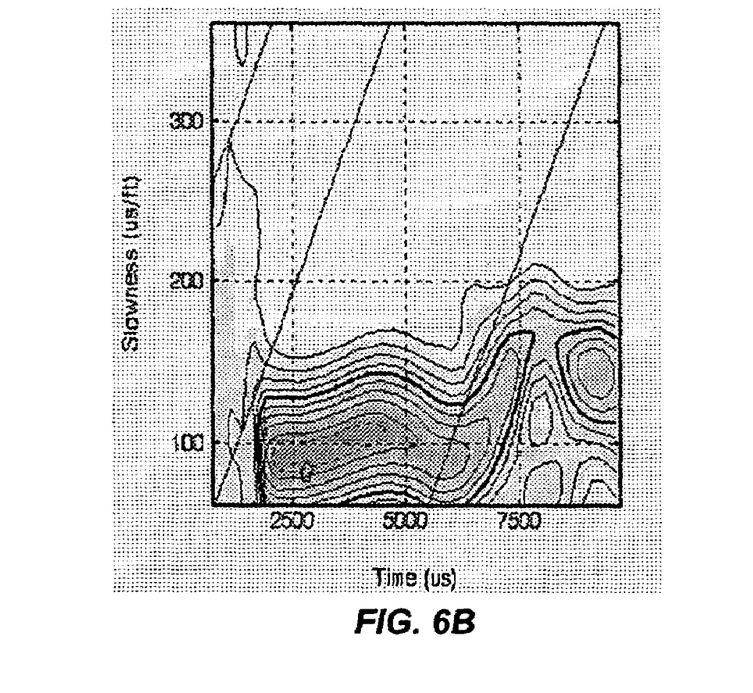
FIG. 6B shows a contour plot of slowness vs. time for the crossed-dipole waveforms of FIG. 6A.
Figure 6C:
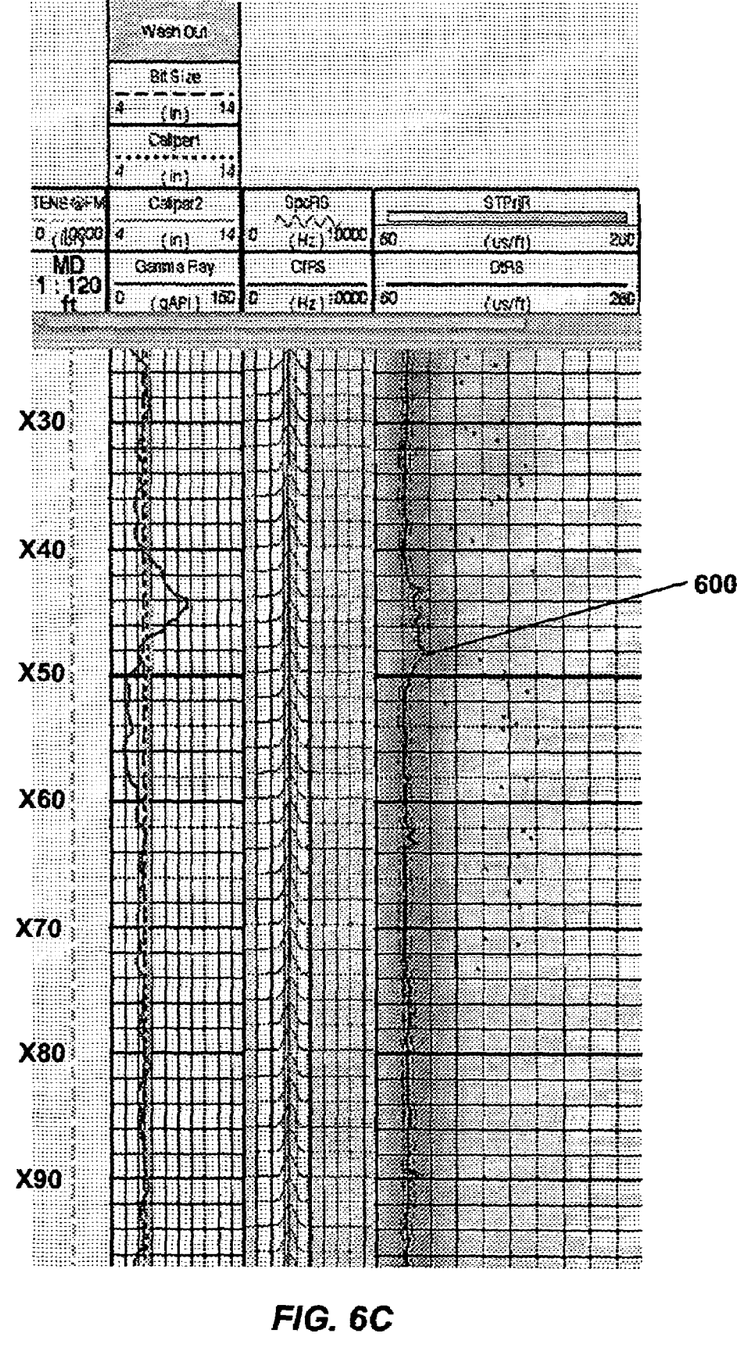
FIG. 6C shows a log obtained from STC processing of crossed-dipole waveforms.

The method according to one embodiment of the invention includes determining far-field slowness in the fast-shear and slow-shear directions (204 in FIG. 2A). Far-field slowness in the fast-shear and slow-shear directions can be determined from the low-frequency portion of the rotated crossed-dipole waveforms using, for example, Slowness-Time-Coherence (STC) analysis, also known as semblance processing. STC involves identifying and measuring the slowness and time arrival of coherent energy propagating across an array of receivers. The technique includes passing a narrow window across the waveforms received at the receiver stations and measuring the coherence within the window for a wide range of slowness and times of arrivals. STC is described in, for example, Kimball, C. V., Shear slowness measurement by dispersive processing of the borehole flexural mode: Geophysics, Vol. 63, No. 2, p. 337-344. The same process can be used to determine near-wellbore slowness in the fast-shear and slow-shear directions (206 in FIG. 2A), except in this case STC is applied to the high-frequency portion of the rotated crossed-dipole waveforms. FIG. 6A depicts crossed-dipole waveforms at a depth X50 in a borehole penetrating a slow formation, taken with an eight-receiver array, with 0.5 ft (0.152 m) spacing between the receivers. FIG. 6B shows a contour plot of slowness versus time for the crossed-dipole waveforms shown in FIG. 6A. The slowness versus time is obtained from STC processing of the crossed-dipole waveforms. FIG. 6C shows a log produced by STC processing of crossed-dipole waveform data for the borehole of FIG. 6A for depths X30 to X90. The track 600 represents slowness as a function of depth.

Once the far-field and near-wellbore slownesses are determined, the process for distinguishing between intrinsic and stress-induced anisotropy is quite simple. As previously mentioned, this involves comparing the far-field and near-wellbore slownesses in the fast-shear and slow-shear directions (208 in FIG. 2A). The test is illustrated in FIG. 2B. A depth of the formation is selected (208a). For the selected depth, if the fast-shear slowness in the far-field (low frequency) is less than the slow-shear slowness in the far-field (208b) and if the fast-shear slowness in the near-wellbore (high frequency) is less than the slow-shear slowness in the near-wellbore (208c), then the formation at the selected depth is marked as having intrinsic anisotropy. For the selected depth, if the fast-shear slowness in the far-field (low frequency) is less than the slow-shear slowness in the far-field (208b) and if the fast-shear slowness in the near-wellbore (high frequency) is greater than the slow-shear slowness in the near-wellbore (208d), then the formation at the selected depth is marked as having stress-induced anisotropy. It follows from the above that the selected interval of the formation is isotropic if the fast-shear slowness and slow-shear slowness in the far-field are the same and if the fast-shear slowness and slow-shear slowness in the near-wellbore are the same. The method may also include marking a selected depth of the formation as having isotropic anisotropy.

The invention typically provides the following advantages. The method allows continuous processing of crossed-dipole waveform data to characterize shear wave formation anisotropy. Shear wave formation anisotropy can be characterized without advanced dispersion analysis. The fast-shear and slow-shear slownesses in a stressed-induced anisotropic zone are proportional to the minimum and maximum horizontal stress, which allows for quantification of these stresses. This allows for three-dimensional stress inversion modeling for reservoir stimulation, drilling optimization, and hydraulic fracture stimulation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of characterizing shear wave anisotropy in a formation, comprising:
   obtaining crossed-dipole waveforms from a borehole penetrating the formation over a range of depths and frequencies;
   determining far-field slowness in a fast-shear and slow-shear direction using a low-frequency portion of the crossed-dipole waveforms;
   determining near-wellbore slowness in the fast-shear and slow-shear directions using a high-frequency portion of the crossed-dipole waveforms;
   marking a selected depth of the formation as having intrinsic anisotropy if at the selected depth the far-field slowness in the fast-shear direction is less than the far-field slowness in the slow-shear direction and the near-wellbore slowness in the fast-shear direction is less than the near-wellbore slowness in the slow-shear direction; and
   marking a selected depth of the formation as having stress-induced anisotropy if at the selected depth the far-field slowness in the fast-shear direction is less than the far-field slowness in the slow-shear direction and the near-wellbore slowness in the fast-shear direction is greater than the near-wellbore slowness in the slow-shear direction.

2. The method of claim 1, further comprising determining the fast-shear direction prior to determining the far-field slowness and the near-wellbore slowness, wherein the slow-shear direction is orthogonal to the fast-shear direction.

3. The method of claim 2, wherein determining the fast-shear direction comprises Alford Rotation processing of the crossed-dipole waveforms.

4. The method of claim 2, wherein determining the fast-shear direction comprises parametric inversion of the crossed-dipole waveforms.

5. The method of claim 1, wherein obtaining crossed-dipole waveforms comprises disposing two dipole sources in the borehole in orthogonal relation and firing the dipole sources to generate dipole acoustic signals which are transmitted into the formation.

6. The method of claim 5, wherein obtaining crossed-dipole waveforms further comprises firing the dipole sources at different azimuthal positions in the borehole.

7. The method of claim 5, wherein obtaining crossed-dipole waveforms further comprises disposing a plurality of dipole receivers in the borehole to detect dipole acoustic signals from the formation.

8. The method of claim 7, wherein a first set of the dipole receivers are inline with one of the dipole sources and a second set of the dipole receivers are inline with the other dipole source.

9. The method of claim 5, wherein one of the dipole sources fires at a low frequency and the other dipole source fires at a high frequency.

10. The method of claim 9, wherein the low frequency is in a range from approximately 1 to 3 kHz.

11. The method of claim 9, wherein the high frequency is in a range from approximately 4 to 7 kHz.

12. The method of claim 9, wherein the low frequency and the high frequency are selected such that dispersion crossover would be detectable if dispersion curves were generated from the crossed-dipole waveforms.

13. The method of claim 9, wherein the high frequency is selected to probe into the formation a radial distance of approximately one-half the borehole diameter.

14. The method of claim 9, wherein the low frequency is selected to probe into the formation a radial distance of approximately two to three times the borehole diameter.

15. The method of claim 1, wherein determining far-field slowness involves processing the crossed-dipole waveforms using slowness-time-coherence.

16. The method of claim 1, wherein determining near-wellbore slowness involves processing the crossed-dipole waveforms using slowness-time coherence.

17. The method of claim 1, further comprising marking the selected depth as having isotropic anisotropy if at the selected depth the far-field slowness in the fast-shear direction is substantially the same as the far-field slowness in the slow-shear direction and/or the near-wellbore slowness in the fast-shear direction is substantially the same as the near-wellbore slowness in the slow-shear direction.

* * * * *